United States Patent
Gaughan et al.

(10) Patent No.: US 12,036,964 B2
(45) Date of Patent: Jul. 16, 2024

(54) BRAKE HEALTH MONITORING SYSTEM

(71) Applicant: Westinghouse Air Brake Technologies Corporation, Pittsburgh, PA (US)

(72) Inventors: Edward Gaughan, Wilmerding, PA (US); Gary Sich, Wilmerding, PA (US); William Potter, Wilmerding, PA (US); Vincent Troiani, Wilmerding, PA (US); Frank Huchrowski, Wilmerding, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 530 days.

(21) Appl. No.: 17/191,435

(22) Filed: Mar. 3, 2021

(65) Prior Publication Data
US 2021/0339728 A1 Nov. 4, 2021

Related U.S. Application Data

(60) Provisional application No. 63/018,199, filed on Apr. 30, 2020.

(51) Int. Cl.
*B60T 17/00* (2006.01)
*B60T 17/22* (2006.01)

(52) U.S. Cl.
CPC ......... *B60T 17/228* (2013.01); *B60T 2270/88* (2013.01)

(58) Field of Classification Search
CPC ... B60T 17/228; B60T 2270/88; B60T 13/665
See application file for complete search history.

(56) References Cited

U.S. PATENT DOCUMENTS

| | | | |
|---|---|---|---|
| 4,317,988 A | 3/1982 | Wilson | |
| 6,322,161 B1 * | 11/2001 | Maslonka | B60T 7/12 303/89 |
| 7,769,509 B2 | 8/2010 | Gaughan et al. | |
| 9,216,724 B1 * | 12/2015 | Wright | B60T 17/22 |
| 9,963,126 B1 * | 5/2018 | Wright | B60T 7/128 |
| 2007/0044551 A1 | 3/2007 | Fogelstrom | |

(Continued)

FOREIGN PATENT DOCUMENTS

| | | |
|---|---|---|
| KR | 10-2019-0064826 A | 6/2019 |
| WO | 2017035516 A1 | 3/2017 |

OTHER PUBLICATIONS

"Afshari et al., A train air brake force model: Car control unit and numerical results, 2012, Institution of Mechanical Engineers, Journal of Rail and Rapid Transit" (Year: 2012).*

(Continued)

*Primary Examiner* — Tiffany P Young
(74) *Attorney, Agent, or Firm* — K&L Gates LLP

(57) ABSTRACT

A brake health monitoring system and method measure pressures in different components of a brake system of a vehicle system during movement of the vehicle system. Two or more of the pressures that are measured in the different components are compared with each other to select a health monitoring mode. One or more allowable pressures are selected based on the health monitoring mode that is selected. A state of health of the brake system is determined by comparing one or more of the pressures that is measured with the one or more allowable pressures that are selected.

20 Claims, 7 Drawing Sheets

(56) References Cited

U.S. PATENT DOCUMENTS

| | | | |
|---|---|---|---|
| 2008/0129480 A1* | 6/2008 | Gaughan | B60T 17/228 340/815.45 |
| 2013/0304313 A1* | 11/2013 | Svensson | B60T 17/221 701/34.4 |
| 2016/0264120 A1 | 9/2016 | Kellner et al. | |
| 2016/0318491 A1* | 11/2016 | Seaton | B60T 17/228 |
| 2017/0203745 A1* | 7/2017 | Kumar | B61L 15/0081 |
| 2018/0319414 A1 | 11/2018 | Lefebvre et al. | |
| 2019/0206261 A1 | 7/2019 | Szymczak et al. | |
| 2020/0079343 A1 | 3/2020 | Martin | |
| 2020/0384974 A1* | 12/2020 | Call | B60T 17/228 |
| 2021/0122350 A1* | 4/2021 | Farres | B60T 8/17 |
| 2021/0181760 A1* | 6/2021 | Lee | G05D 1/0287 |
| 2021/0284179 A1* | 9/2021 | Diamond | B60W 50/00 |
| 2021/0318199 A1* | 10/2021 | Rosenberg | B60T 13/745 |

OTHER PUBLICATIONS

International Preliminary Report on Patentability dated Sep. 15, 2022 for corresponding International application No. PCT/US2021/020728 (9 pages).
International Search Report and Written Opinion dated Jun. 9, 2021 for corresponding International application No. PCT/US2021/020728 (15 pages).

* cited by examiner

BRAKE HEALTH MONITORING SYSTEM

CROSS-REFERENCE TO RELATED APPLICATIONS

This application claims priority to U.S. Provisional Application No. 63/018,199, which was filed 30 Apr. 2020, and the entire disclosure of which is incorporated herein by reference.

BACKGROUND

Technical Field

The subject matter described herein relates to systems and methods that monitor the health of brake systems.

Discussion of Art

Some vehicle systems include complex brake systems to ensure the safe travel of the vehicle systems. Rail vehicles may rely on air brake systems that change pressure within the brake systems to slow or stop movement of the rail vehicles. These air brake systems can include many pipes, reservoirs, connectors, and the like. As the number of components in the brake systems increase, so does the complexity of the brake systems.

A need exists to monitor the health of brake systems and/or to predict when maintenance on the brake systems is needed.

BRIEF DESCRIPTION

In one embodiment, a method is provided that includes measuring pressures in different components of a brake system of a vehicle system during movement of the vehicle system, comparing two or more of the pressures that are measured in the different components with each other to select a health monitoring mode, selecting one or more allowable pressures based on the health monitoring mode that is selected, and determining a state of health of the brake system by comparing one or more of the pressures that is measured with the one or more allowable pressures that are selected.

In one embodiment, a system is provided that includes pressure sensors configured to measure pressures in different components of a brake system of a vehicle system during activation of the brake system and a controller configured to compare two or more of the pressures that are measured in the different components with each other to select a health monitoring mode. The controller is configured to select one or more allowable pressures based on the health monitoring mode that is selected and to determine a state of health of the brake system by comparing one or more of the pressures that is measured with the one or more allowable pressures that are selected.

In one embodiment, a method is provided that includes measuring pressures in different components of a brake system of a vehicle system, comparing two or more of the pressures that are measured in the different components with each other to select a health monitoring mode, and determining a state of health of the brake system by comparing one or more of the pressures that is measured with the one or more allowable pressures that are selected.

In any of the systems or methods described herein, the determined state of health can be used as a basis for one or more of controlling movement of the vehicle system, controlling an onboard device of the vehicle system, scheduling a maintenance operation of the vehicle, scheduling movement of the vehicle system, controlling a display to display the state of health, etc.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide brake monitoring systems and methods that can monitor the performance of vehicle brake systems to track the health of the brake systems and predict performance of the brake systems. While one or more embodiments described herein relates to air brake systems of rail vehicles, not all embodiments are limited to rail vehicles. For example, one or more embodiments may be used in connection with the brake systems of other types of vehicles, such as trucks with or without trailers.

Figure 1:
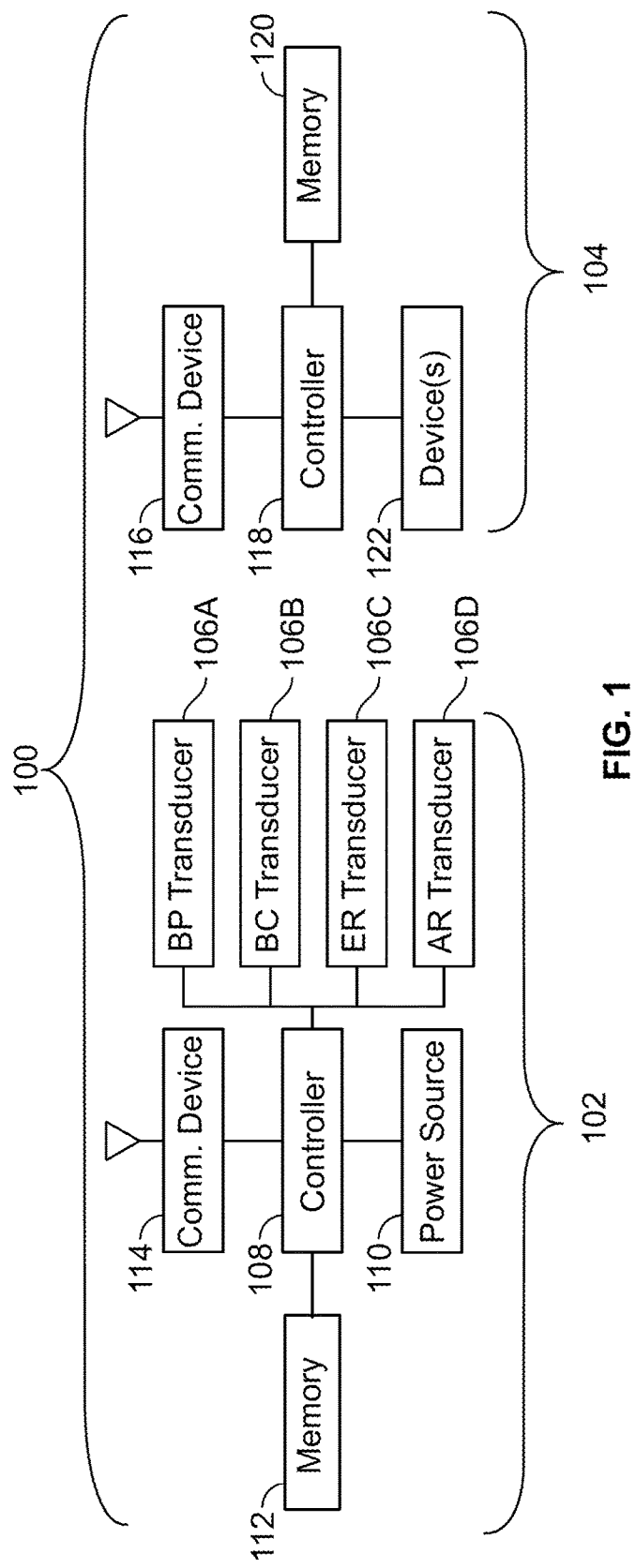
FIG. 1 illustrates one example of a brake health monitoring system.
Figure 2:
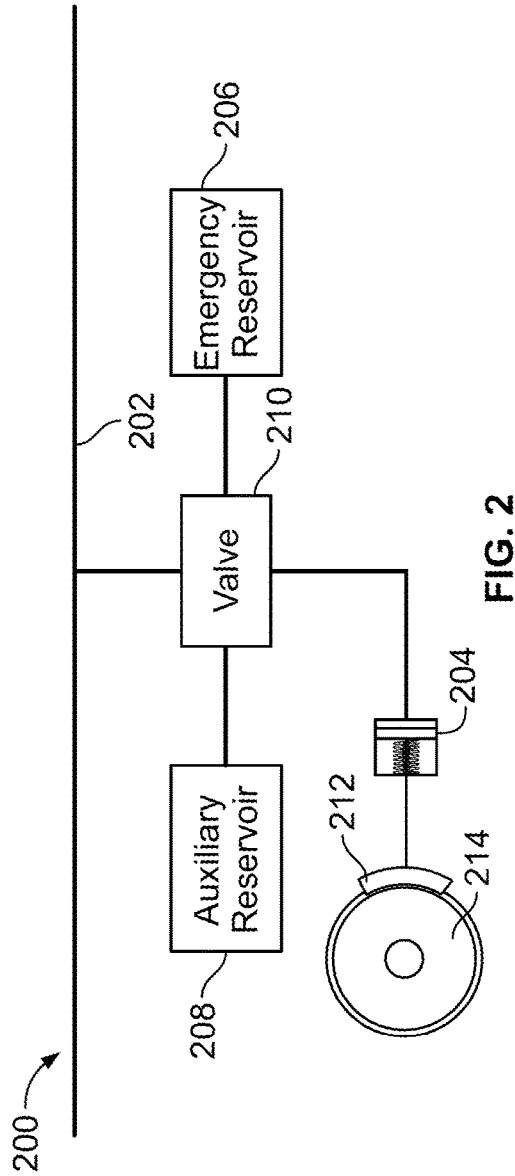
FIG. 2 illustrates one example of a brake system.

FIG. 1 illustrates one example of a brake health monitoring system 100. The monitoring system may be disposed onboard a vehicle system having a brake system 200 (shown in FIG. 2) that operates to slow or stop movement of the vehicle system. One example of a portion of the brake system that is disposed onboard a vehicle in the vehicle system is shown in FIG. 2. The monitoring system includes one or more sensor assemblies 102 and a control assembly 104. The sensor assembly may be disposed onboard one or more vehicles in the vehicle system. For example, in a rail vehicle system, one or more rail cars (or other non-propulsion-generating vehicles) may have an onboard sensor assembly and a locomotive (or other propulsion-generating vehicle) may have the control assembly onboard.

The sensor assembly includes several sensors 106A-D. While four sensors are shown, optionally, a different number of sensors or only a single sensor may be provided. The sensors can be pressure sensors, such as pressure transducers, that measure pressures in the brake system. For example, the sensors can be transducers that measure air pressures in different locations in the brake system. In the illustrated embodiment, the sensors include a brake pipe transducer 106A ("BP Transducer" in FIG. 1) that can be placed within and measure air pressure in a brake pipe 202 or portion of the brake pipe in the vehicle on which the sensor assembly is disposed. The sensors include a brake cylinder transducer 106B ("BC Transducer" in FIG. 1) that can placed within and measure air pressure in a brake cylinder 204 in the vehicle on which the sensor assembly is disposed.

The sensors include an emergency reservoir transducer 106C ("ER Transducer" in FIG. 1) that can be placed in and measure air pressure in an emergency reservoir 206 in the vehicle on which the sensor assembly is disposed. The sensors include an auxiliary reservoir transducer 106D ("AR Transducer" in FIG. 1) that can be placed in and measure air pressure in an auxiliary reservoir 208 in the vehicle on which the sensor assembly is disposed. In operation, a compressor of the vehicle system pressurizes air in the auxiliary reservoir and emergency reservoir. Compressed air also is distributed along the vehicle system via the brake pipe. The brake pipe is coupled with the auxiliary reservoir and the emergency reservoir on the vehicle (e.g., through a valve 210, such as a triple valve, distributor, or other valve). Air flows between the auxiliary reservoir and the brake cylinder through the valve or distributor. Increasing the air pressure in the brake pipe causes brakes 212 to move away from a wheel 214 of the vehicle and release, while decreasing the air pressure causes the brakes to move toward and engage the wheel via the brake cylinder.

An assembly controller 108 receives measurements output by the sensors. The assembly controller can represent hardware circuitry that includes and/or is connected with one or more processors (e.g., one or more field programmable gate arrays, one or more integrated circuits, one or more microcontrollers, etc.) that can obtain air pressure measurements from the sensors.

The assembly controller can store one or more of the pressure measurements from the sensors in a tangible and non-transitory computer-readable storage medium, such as a computer memory 112. The assembly controller can communicate one or more of these measurements to an external location via a communication device 114. The communication device represents transceiving hardware, such as one or more antennas, transceivers, or the like. Optionally, the communication device can include or represent a radio frequency identification (RFID) tag that wirelessly communicates the pressure measurements responsive to being interrogated by an RFID reader.

The sensor assembly can be powered by an onboard power source 110, such as one or more batteries. Optionally, if the vehicle on which the sensor assembly has power from another source, such as a generator or alternator, the sensor assembly can be powered by this other source.

The control assembly may be disposed onboard the same vehicle as the sensor assembly or onboard another vehicle. The control assembly includes a communication device 116 (e.g., transceiving hardware) that allows the control assembly to communicate with the sensor assembly or sensor assemblies. The communication device 116 can receive pressure measurements from the sensor assembly and provide the measurements to a system controller 118. The system controller can represent hardware circuitry that includes and/or is connected with one or more processors that examine the pressure measurements as described herein. Optionally, the assembly controller can examine the pressure measurements as described herein.

The system controller can record one or more of the pressure measurements and/or results of examination of the pressure measurements in a tangible and non-transitory computer-readable storage medium, such as a computer memory 120. Optionally, the system controller can generate and communicate one or more signals to another device 122. For example, the system controller can generate an output signal that causes an output device (e.g., an electronic display, a speaker, a light, etc.) to generate a notification or warning to inform an operator of a potential fault or need for maintenance or inspection based on the examination of the pressure measurements. As another example, the system controller can generate a control signal that changes operation of the vehicle system based on examination of the measured pressures. For example, the system controller can control a propulsion system and/or brake system of the vehicle system to slow or stop movement of the vehicle system, can steer the vehicle system toward a location where inspection, maintenance, or repair of the brake system can be performed, or the like.

In operation, the brake monitoring system can monitor pressures measured in the emergency reservoir, the brake pipe, the brake cylinder, and/or the auxiliary reservoir and determine acceptable levels of pressure to determine the state of the brake system in real time (e.g., as the vehicle system is moving and/or the brake system is being used). Optionally, the brake monitoring system can predict when repair or replacement of the brake system is needed based on the measured pressures. The decision parameter on which the analysis of the state of the brake system is determined may be a reference pressure differential, such as a difference between two or more of the measured pressures, a comparison between two or more pressures, or the like. For example, the state of the brake system can be determined based on a difference or comparison of the emergency reservoir pressure and the brake pipe pressure, a difference or comparison of the emergency reservoir pressure and the auxiliary reservoir pressure, etc.

The monitoring system can operate in different modes, such as a wake-up mode that is active when the monitoring system begins analysis of the brake system, a smaller reduction monitor mode that is active when a reduction in the pressure in the brake pipe is less than a first designated threshold (e.g., five to eight pounds per square inch, psi, or another value), a larger reduction monitor mode that is active when a reduction in the brake pipe pressure is no less than the first threshold (e.g., at least nineteen psi), and a low pressure monitor mode that is active when the pressure in the brake pipe is less than a lower, second designated threshold, such as five psi (or another value). Depending on which mode is active, different allowable values for the brake cylinder pressures, for differences between the emergency reservoir pressures and the brake pipe pressures, and for leakage of the reservoirs and brake cylinder pressures are used to determine if an error or alarm is to be activated (e.g., responsive to the measured values falling outside the applicable values).

FIGS. 3A through 3D illustrate a flowchart of one example of a method 300 for monitoring the health of a brake system. The method can be used to monitor the state of a brake system of a vehicle and optionally to predict when service or inspection of the brake system is needed. The method can operate in real time—for example, the method can be performed by the monitoring system while the vehicle system is moving and using (or attempting to use) the brake system to slow or stop movement of the vehicle system. The system controller and/or assembly controller can perform the calculations and analysis described in connection with the method based on pressure measurements received from the pressure sensors.

Figure 3A:
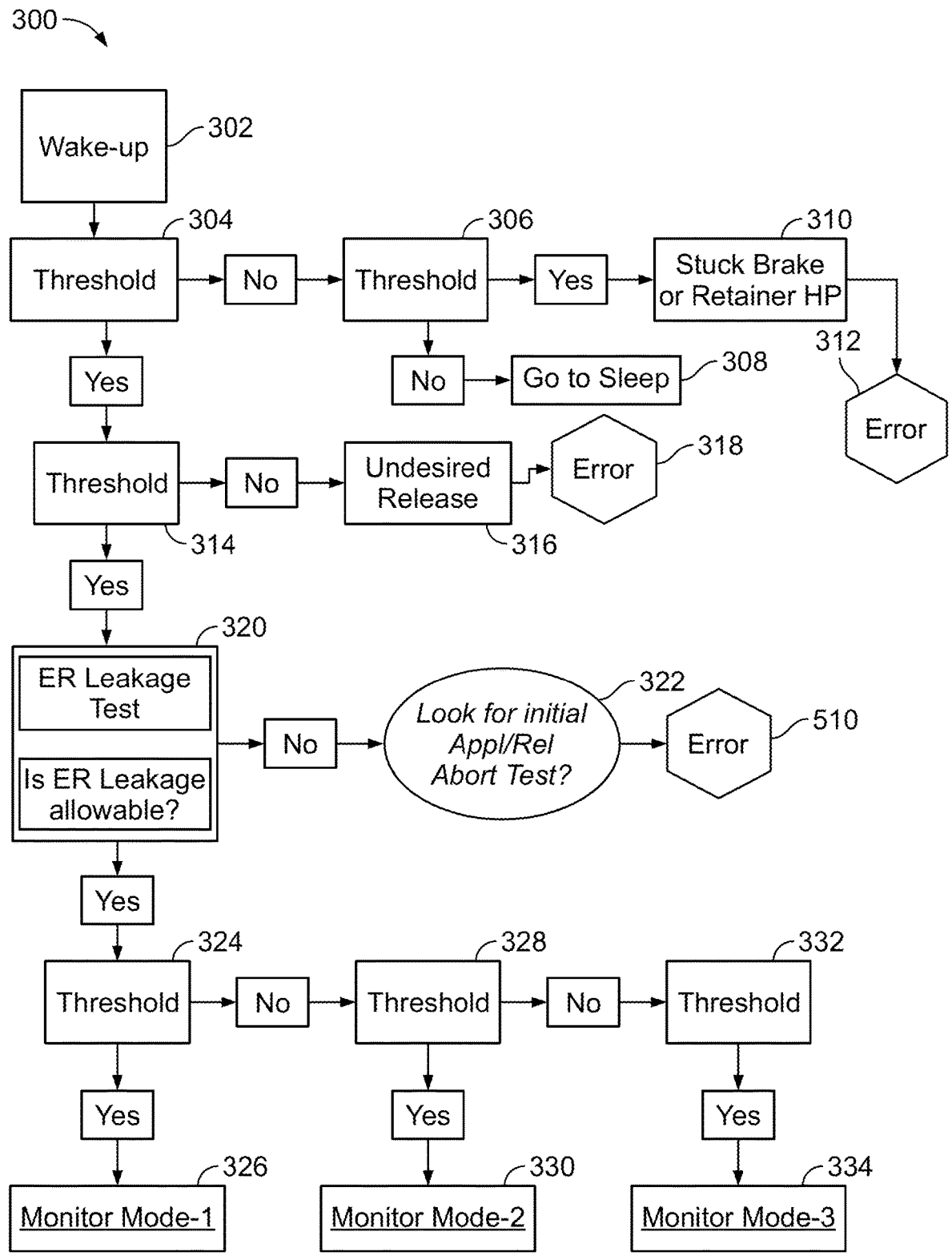
FIG. 3A illustrates an example of one portion of a flowchart for a method of monitoring a health state of a brake system.

At 302 in FIG. 3A, the monitoring system wakes up to begin the monitoring process. For example, the sensor assembly may be in a standby or inactive state to conserve energy. The sensor assembly may activate or turn on at regularly scheduled times (e.g., periodically), responsive to receiving a signal (e.g., from the system controller, from an RFID reader, from an operator, or the like), and/or at non-regularly scheduled times (e.g., at irregular times).

At 304, a determination is made as to whether a reference pressure differential exceeds a first threshold. For example, the difference between the pressure measured by the emergency reservoir sensor 106C and the pressure measured by the brake pipe sensor 106A can be determined. This differential can be compared to a first pressure threshold, such as five psi. Alternatively, another pressure may be used as the threshold, such as three psi, seven psi, ten psi, or the like.

If the differential between the emergency reservoir pressure and the brake pipe pressure does not exceed the low pressure threshold, then the pressure in the emergency reservoir and the brake pipe indicates that the brakes may not have been recently applied. As a result, flow of the method can proceed toward 306. But, if the differential between the emergency reservoir pressure and the brake pipe pressure is at least as large as the low pressure threshold, then the pressure in the emergency reservoir and the brake pipe may indicate that the brakes have been recently applied or there is a potential issue with the brake system. As a result, flow of the method can proceed toward 314.

At 306, a determination is made as to whether the pressure in the brake cylinder is greater than a second pressure threshold. This pressure threshold may be the same first pressure threshold described above in connection with 304. Alternatively, the second pressure threshold may be larger or smaller than the first pressure threshold. If the pressure in the brake cylinder is greater than the second pressure threshold, then the increased pressure can indicate that the brakes have not been recently applied and that the pressures in the brake system indicate a healthy brake system (or portion of the brake system onboard a vehicle). As a result, this cycle or instance of the method can end at 308. The sensor assembly can return to a sleep state, an inactive state, or be turned off until the sensor assembly wakes up to perform another cycle or instance of the method (e.g., as described above at 302).

But, if the pressure in the brake cylinder is greater than the second pressure threshold, then this increased brake cylinder pressure (and the emergency reservoir pressure and brake pipe pressure differential being not greater than the first threshold) can indicate a potential issue or problem with the brake system. For example, the brake may be identified as being stuck in an engaged state against the wheel, a retainer (e.g., check valve) in the brake cylinder may be stuck in a high pressure state or position, or the like. At 310, the analysis controller and/or system controller can determine that the brake and/or retainer valve is stuck in position and not moving. One or more responsive actions 312 may be implemented in response to making this determination. For example, the analysis controller and/or system controller can cause a message (e.g., an error code) to be displayed or otherwise presented to an operator. This message can state that the brake is stuck and/or the retainer valve is stuck in a high pressure state or position. Optionally, the analysis controller and/or system controller can automatically engage the brake to try and release the stuck brake and/or retainer valve. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

Returning to the description of the decision made at 304, if the reference pressure differential between the emergency reservoir pressure and the brake pipe pressure is greater than the first pressure threshold, this differential can indicate that the brake has been recently engaged. Flow of the method can proceed toward 314. At 314, the cylinder pressure is determined and compared to a third pressure threshold. This third pressure threshold is the same as the second pressure threshold in one embodiment. Alternatively, the third pressure threshold may be another value (e.g., a greater or lesser pressure). If the cylinder pressure is not greater than this third pressure threshold, then the lower pressure in the brake cylinder may indicate that the brake was undesirably released or that the brake failed to engage. At 316, a determination is made (e.g., by the analysis controller and/or system controller) that the brake was undesirably released. This may occur when the brake is commanded to remain engaged but has released from the wheel. One or more responsive actions 318 may be implemented in response to making this determination. For example, the analysis controller and/or system controller can cause a message (e.g., an error code) to be displayed or otherwise presented to an operator. This message can state that the brake is not engaged or set against the wheel (e.g., that the brake was unintentionally released). Optionally, the analysis controller and/or system controller can automatically attempt to engage the brake. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

Returning to the description of the decision made at 314, if the cylinder pressure is greater than this third pressure threshold, then a leakage test may need to be performed on the emergency reservoir to determine whether any leakage from this reservoir is acceptable (to maintain safe operation of the brake system). As a result, flow of the method can proceed toward 320.

At 320, an emergency reservoir leakage test is performed and a determination of whether the amount of leakage from the emergency reservoir is acceptable. For example, leakage from the emergency reservoir can be determined and compared to a leakage threshold. If the measured leakage is more than this leakage threshold, then the measured leakage may be unacceptable, and flow of the method can proceed toward 322. But, if the measured leakage is not more than this leakage threshold, then the measured leakage may be acceptable, and flow of the method can proceed toward 324. One example of this emergency reservoir leakage test is described below in connection with FIG. 4.

At 322, a determination is made as to whether there was or is an application of the brake that is resulting in the differential (between the emergency reservoir pressure and the brake pipe pressure) being greater than the first threshold, the brake cylinder pressure being greater than the third threshold, and the measured leakage from the emergency reservoir being more than the allowable amount. For example, the analysis controller and/or system controller can determine whether the brakes were engaged within a previous time period (e.g., within the previous five to ten minutes)

from events recorded in the memory (e.g., an event recorder), based on input provided by an operator of the vehicle system, or the like. If the brake or brakes has or have been recently engaged, then the method may end (the test may be aborted), and one or more responsive actions optionally may be implemented (e.g., at 510). For example, one or more responsive actions may be implemented, such as the analysis controller and/or system controller causing a message (e.g., an error code) to be displayed or otherwise presented to an operator. This message can state that there is excessive leakage from the emergency reservoir. As another example, the analysis controller and/or system controller can send a message to an off-board location to request, schedule, and/or initiate an inspection and/or repair of the brake system when the vehicle system arrives at an upcoming location. Flow of the method can then return to one or more other operations or terminate.

At 324, a determination is made as to whether a reference pressure differential between the emergency reservoir pressure and the brake pipe pressure is less than a fourth pressure threshold. For example, a difference between (a) the prior measurement or a more recent measurement of the pressure in the emergency reservoir and (b) the prior measurement or a more recent measurement of the pressure in the brake pipe can be compared to a threshold of eighteen psi (or another value, such as ten psi, fifteen psi, twenty psi, etc.). If this difference is less than the fourth threshold, then the monitoring system may enter into a first monitoring mode at 326. But, if this difference is not less than the fourth threshold, then the first monitoring mode may be inappropriate for determining a state of the health of the brake system. As a result, flow of the method can proceed toward 328.

At 328, a determination is made as to whether the differential between the emergency reservoir pressure and the brake pipe pressure is greater than a fifth pressure threshold. The fifth pressure threshold may be larger than the fourth pressure threshold used at 324. For example, this difference can be compared to a threshold of twenty-five psi (or another value, such as twenty psi, thirty psi, etc.). If this difference is greater than the fifth threshold, then the monitoring system may enter into a second monitoring mode at 330. But, if this difference is not greater than the fifth threshold, then the second monitoring mode may be inappropriate for determining a state of the health of the brake system. As a result, flow of the method can proceed toward 332.

At 332, a determination is made as to whether the brake pipe pressure is less than a sixth pressure threshold. In one example, this sixth pressure threshold may be less than the fourth and fifth pressure thresholds. In one embodiment, the sixth pressure threshold may be the same as the first pressure threshold. If the brake pipe pressure is less than the sixth pressure threshold, then the monitoring system may enter into a third monitoring mode at 334. But, if the brake pipe pressure is not smaller than the sixth threshold, then the method can terminate or return to 302.

Figure 3B:
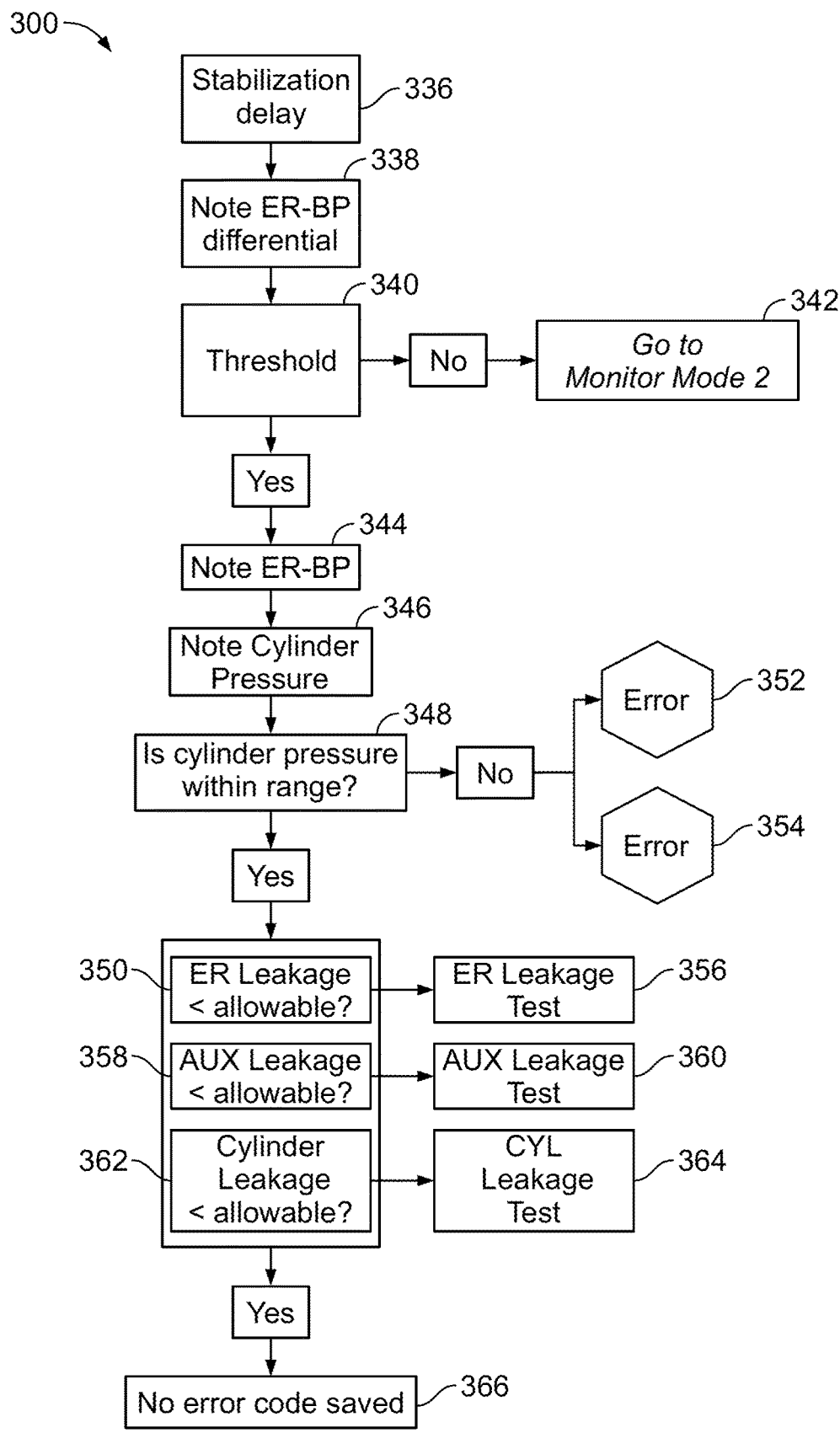
FIG. 3B illustrates an example of a first monitoring mode portion of the flowchart for the method of monitoring the health state of the brake system shown in FIG. 3A.

FIG. 3B illustrates one example of a portion of the method that includes the first monitoring mode of the monitoring system. The portion of the method shown in FIG. 3B may be performed subsequent to or part of 326 in FIG. 3A. At 336 in FIG. 3B, a stabilization delay is performed. The stabilization delay can include no new pressure measurements being obtained for at least a designated, non-zero period of time to permit fluctuations in the pressures to become smaller or eliminated. This period of time can be five seconds, thirty seconds, sixty seconds, or the like.

At 338, a measurement of the emergency reservoir pressure and a measurement of the brake pipe pressure are obtained, and a reference pressure differential between the pressure measurements is determined. For example, the emergency reservoir sensor 106C and the brake pipe sensor 106A can each obtain a new measurement of the pressure in the emergency reservoir and the brake pipe, respectively. The difference between these measurements can be calculated by the system controller and/or assembly controller.

At 340, a determination is made as to whether this differential is less than a seventh pressure threshold. This seventh pressure threshold can be greater than the fourth pressure threshold described above. For example, the seventh pressure threshold can be nineteen psi. Alternatively, the seventh pressure threshold can be smaller than the fourth pressure threshold or may be much larger than the fourth pressure threshold.

Figure 3C:
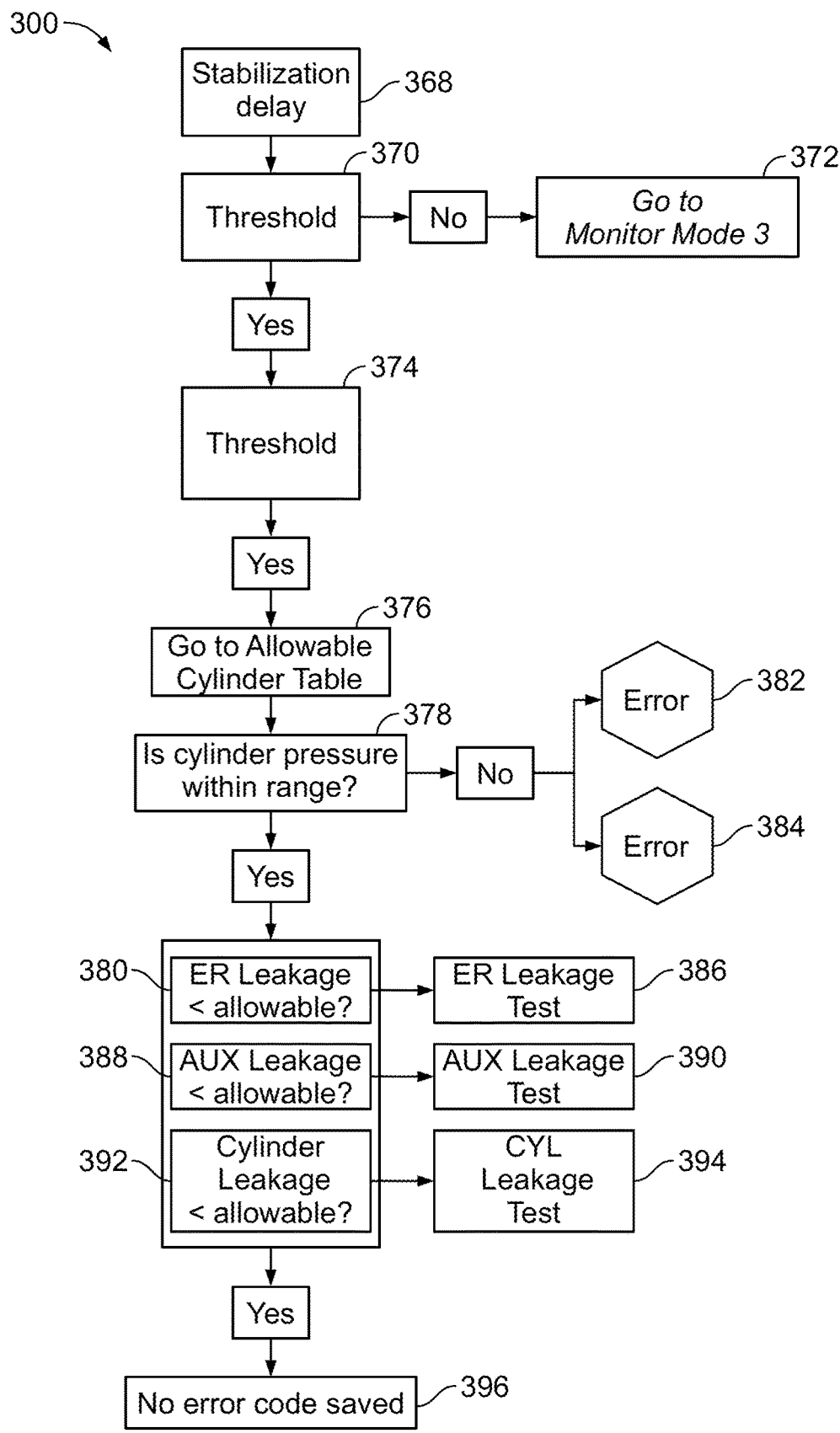
FIG. 3C illustrates an example of a second monitoring mode portion of the flowchart for the method of monitoring the health state of the brake system shown in FIG. 3A.

If the differential between the emergency reservoir pressure and the brake pipe pressure is not less than the seventh pressure threshold, then the first monitoring mode may not be appropriate for examining the health of the brake system. Instead, the method can proceed to the second monitoring mode at 342. One example of the second monitoring mode is shown in FIG. 3C. But, if the differential between the emergency reservoir pressure and the brake pipe pressure is less than the seventh pressure threshold, then the method can proceed toward 344. At 344, additional measurements of the emergency reservoir pressure and the brake pipe pressure are made, and the differential between these pressures can be calculated again.

At 346, the brake cylinder pressure is measured. At 348, a determination is made as to whether the brake cylinder pressure is within an acceptable range of pressures. The acceptable range of pressures that is used for this determination can be selected from several different ranges of pressures stored in at least one of the memories. Different ranges of these pressures can be associated with different differentials between the emergency reservoir pressure and the brake pipe pressure. The differential that is determined at 344 can be used to select one of these ranges of pressures. The brake cylinder pressure is compared to the selected range of pressures. If the brake cylinder pressure is within the selected range of pressures, then flow of the method can proceed toward 350.

But, if the brake cylinder pressure is not within the selected range of pressures, then flow of the method can proceed toward 352 or 354. The method can proceed toward 352 if the brake cylinder pressure is lower than the selected range of pressures. For example, if the differential determined at 344 is fifteen psi and the brake pipe pressure (also determined at 344) is seventy-five psi, then the selected range of acceptable brake cylinder pressures may be 32.6 psi to 43.5 psi. If the brake cylinder pressure is less than 32.6 psi, then the method can implement one or more responsive actions at 352. For example, the analysis controller and/or system controller can cause a message (e.g., an error code) to be displayed or otherwise presented to an operator. This message can state that the brake cylinder pressure is too low. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

Returning to the description of the decision made at 348, the method can proceed toward 354 if the brake cylinder pressure greater than the selected range of pressures. For example, if the differential determined at 344 is fifteen psi and the brake pipe pressure (also determined at 344) is seventy-five psi, then the selected range of acceptable brake cylinder pressures may be 32.6 psi to 43.5 psi. If the brake cylinder pressure is greater than 43.5 psi, then the method can implement one or more responsive actions at 354. For example, the analysis controller and/or system controller can cause a message (e.g., an error code) to be displayed or otherwise presented to an operator. This message can state that the brake cylinder pressure is too high. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

On the other hand, if the method proceeds toward 350 from 348 due to the brake cylinder pressure being within the selected range of pressures, then one or more leakage tests may be performed. In the illustrated example, leakage from the emergency reservoir can be measured at 350, similar to as described above in connection with 320 in FIG. 3A. For example, the emergency reservoir pressure may be monitored for an extended period of time (e.g., several seconds or minutes) to determine whether the pressures is decreasing with respect to time. The amount of this decrease and/or the rate at which the pressure is decreasing can be compared to a leakage threshold and/or a leakage rate threshold associated with the emergency reservoir. If the measured leakage from the emergency reservoir is more than the corresponding threshold associated with the emergency reservoir, then the measured leakage may be unacceptable, and flow of the method can proceed toward 356. At 356, the emergency reservoir leakage test can be performed. One example of this emergency reservoir leakage test is described below in connection with FIG. 4. If the measured leakage from the emergency reservoir is acceptable, however, then flow of the method can proceed from 350 toward 358.

At 358, leakage from the auxiliary reservoir can be measured. For example, the auxiliary reservoir pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the auxiliary reservoir. If the amount and/or rate of leakage is greater than the corresponding threshold, then flow of the method can proceed toward 360. At 360, an auxiliary reservoir leakage test can be performed. One example of this auxiliary reservoir leakage test is described below in connection with FIG. 5. If the amount and/or rate of leakage is not greater than the corresponding threshold, then flow of the method can proceed toward 362.

At 362, leakage from the brake cylinder can be measured. For example, the brake cylinder pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the brake cylinder. If the amount and/or rate of leakage is greater than the corresponding threshold, then flow of the method can proceed toward 364. At 364, brake cylinder leakage test can be performed. One example of this brake cylinder leakage test is described below in connection with FIG. 6. If the amount and/or rate of leakage is not greater than the corresponding threshold, then flow of the method can proceed toward 366.

If the measured leakages (from 350, 358, 362) are within the acceptable limits (e.g., below the associated thresholds), flow of the method may terminate at 366 or may return to one or more other operations, such as 302 or 308.

FIG. 3C illustrates one example of a portion of the method that includes the second monitoring mode of the monitoring system. The portion of the method shown in FIG. 3C may be performed subsequent to or part of 330 in FIG. 3A. At 368 in FIG. 3C, a stabilization delay is performed. The stabilization delay can include no new pressure measurements being obtained for at least a designated, non-zero period of time to permit fluctuations in the pressures to become smaller or eliminated. This period of time can be five seconds, thirty seconds, sixty seconds, or the like.

At 370, a measurement of the brake pipe pressure is obtained, and the brake pipe pressure is compared to a pressure threshold. In the illustrated example, this threshold is the first threshold (e.g., five psi), but optionally may be a higher or lower pressure.

Figure 3D:
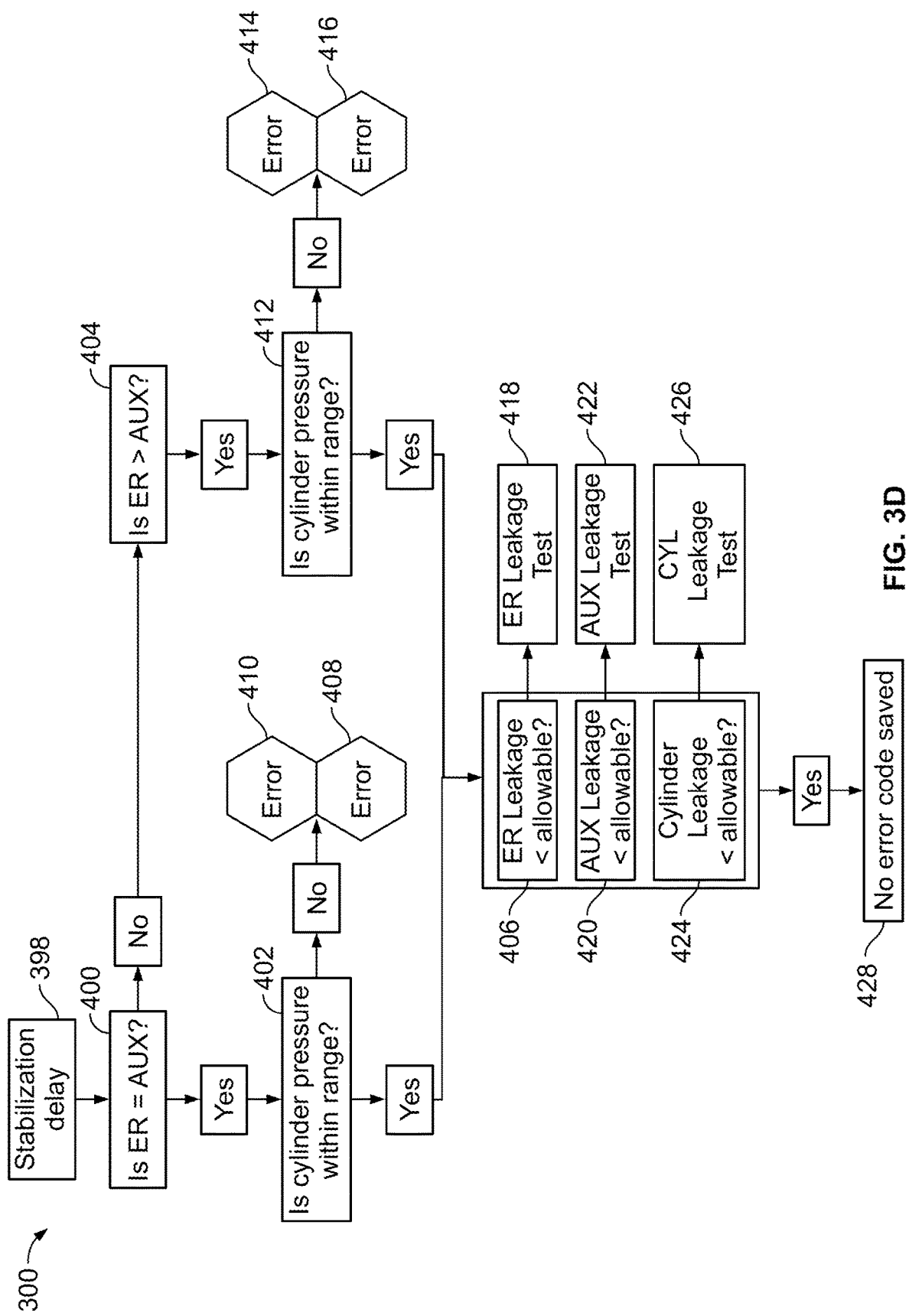
FIG. 3D illustrates an example of a third monitoring mode portion of the flowchart for the method of monitoring the health state of the brake system shown in FIG. 3A.

If the brake pipe pressure is not less than the threshold, then the second monitoring mode may not be appropriate for examining the health of the brake system. Instead, the method can proceed to the third monitoring mode at 372. One example of the third monitoring mode is shown in FIG. 3D. But, if the brake pipe pressure is greater than the pressure threshold, then the method can proceed toward 374.

At 374, additional measurements of the emergency reservoir pressure and the brake pipe pressure are made, and the reference pressure differential between these pressures can be calculated again, and this differential can be compared to another pressure threshold. In the illustrated example, this threshold is nineteen psi. Optionally, the pressure threshold may be higher or lower. If the differential is greater than this threshold, then further examination of the brake system may be needed to evaluate the state of health of the brake system. As a result, flow of the method can proceed toward 376. If the differential is not greater than the threshold, then no further examination of the brake system may be needed to evaluate the state of health of the brake system. As a result, flow of the method can terminate or return to another operation (e.g., 302 or 308).

At 376, the brake cylinder pressure is measured, and a determination is made as to whether the brake cylinder pressure is within an acceptable range of pressures. The acceptable range of pressures that is used for this determination can be selected from several different ranges of acceptable pressures stored in at least one of the memories. Different ranges of these pressures can be associated with different brake pipe pressures and different differentials between the emergency reservoir pressure and the brake pipe pressure. The brake pipe pressure and/or emergency reservoir pressure can be measured to determine which range to compare to the brake cylinder pressure. Alternatively, a prior brake pipe pressure measurement and/or a prior emergency reservoir pressure can be used to determine which range to compare to the brake cylinder pressure. For example, if the brake pipe pressure is measured to be seventy-nine psi and the differential between the brake pipe pressure and the emergency reservoir pressure is eleven psi, then the range of acceptable pressures that is selected may include pressures from twenty-three psi to 29.8 psi. Alternatively, another range may be used.

At 378, the brake cylinder pressure is compared to the selected range of pressures. If the brake cylinder pressure is within the selected range of pressures, then flow of the method can proceed toward 380.

But, if the brake cylinder pressure is not within the selected range of pressures, then flow of the method can proceed toward 382 or 384. The method can proceed toward 382 if the brake cylinder pressure is lower than the selected range of pressures. The method can implement one or more responsive actions at 382. For example, the analysis controller and/or system controller can cause a message (e.g., an error code) to be displayed or otherwise presented to an operator. This message can state that the brake cylinder pressure is too low. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

Returning to the description of the decision made at 378, the method can proceed toward 384 if the brake cylinder pressure greater than the selected range of pressures. The method can implement one or more responsive actions at 384. For example, the analysis controller and/or system controller can cause a message (e.g., an error code) to be displayed or otherwise presented to an operator. This message can state that the brake cylinder pressure is too high. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

On the other hand, if the method proceeds toward 380 from 378 due to the brake cylinder pressure being within the selected range of pressures, then one or more leakage tests may be performed. In the illustrated example, leakage from the emergency reservoir can be measured at 380, similar to as described above in connection with 320 in FIG. 3A. For example, the emergency reservoir pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the emergency reservoir. If the measured leakage from the emergency reservoir is more than the corresponding threshold associated with the emergency reservoir, then the measured leakage may be unacceptable, and flow of the method can proceed toward 386. At 386, the emergency reservoir leakage test can be performed. One example of this emergency reservoir leakage test is described below in connection with FIG. 4. If the measured leakage from the emergency reservoir is acceptable, however, then flow of the method can proceed from 380 toward 388.

At 388, leakage from the auxiliary reservoir can be measured. For example, the auxiliary reservoir pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the auxiliary reservoir. If the amount and/or rate of leakage is greater than the corresponding threshold, then flow of the method can proceed toward 390. At 390, an auxiliary reservoir leakage test can be performed. One example of this auxiliary reservoir leakage test is described below in connection with FIG. 5. If the amount and/or rate of leakage is not greater than the corresponding threshold, then flow of the method can proceed from 388 toward 392.

At 392, leakage from the brake cylinder can be measured. For example, the brake cylinder pressure may be monitored for an extended period of time (e.g., several seconds or minutes) to determine whether the pressures is decreasing with respect to time. The amount of this decrease and/or the rate at which the pressure is decreasing can be compared to a leakage threshold and/or a leakage rate threshold associated with the brake cylinder. If the amount and/or rate of leakage is greater than the corresponding threshold, then flow of the method can proceed toward 394. At 394, brake cylinder leakage test can be performed. One example of this brake cylinder leakage test is described below in connection with FIG. 6. If the amount and/or rate of leakage is not greater than the corresponding threshold, then flow of the method can proceed from 392 toward 396.

If the measured leakages (from 380, 388, 392) are within the acceptable limits (e.g., below the associated thresholds), flow of the method may terminate at 396 or may return to one or more other operations, such as 302 or 308.

FIG. 3D illustrates one example of a portion of the method that includes the third monitoring mode of the monitoring method. The portion of the method shown in FIG. 3D may be performed subsequent to or part of 334 in FIG. 3A. At 398 in FIG. 3D, a stabilization delay is performed. The stabilization delay can include no new pressure measurements being obtained for at least a designated, non-zero period of time to permit fluctuations in the pressures to become smaller or eliminated. This period of time can be five seconds, thirty seconds, sixty seconds, or the like.

At 400, a measurement of the emergency reservoir pressure and a measurement of the auxiliary reservoir pressure are obtained and compared with each other. For example, the emergency reservoir sensor 106C and the auxiliary reservoir sensor 106D can each obtain a new measurement of the pressure in the emergency reservoir and the brake pipe, respectively. The analysis controller and/or system controller can determine if the emergency reservoir pressure and the auxiliary reservoir pressure are equivalent to each other. For example, the analysis controller and/or system controller can determine whether a reference pressure differential between the emergency reservoir pressure and the auxiliary reservoir pressure is less than a threshold. Optionally, the analysis controller and/or system controller can determine if the emergency reservoir pressure and the auxiliary reservoir pressure are substantially equivalent to each other, such as being within a measurement error of each other or being within a designated range of each other (such as two psi).

If the emergency reservoir pressure and the auxiliary reservoir pressure are equal to each other or substantially equal to each other, then flow of the method can proceed toward 402 to examine the brake cylinder pressure and determine if the brake cylinder pressure is within one or more elevated pressure ranges. But, if the emergency reservoir pressure and the auxiliary reservoir pressure are not equal to each other or not substantially equal to each other, then flow of the method can proceed toward 404 to determine whether the emergency reservoir pressure is greater than the auxiliary reservoir pressure.

At 402, the brake cylinder pressure is measured and compared to a selected range of acceptable pressures. The range of acceptable pressures that is used for this determination can be selected from a first set of several different ranges of pressures stored in at least one of the memories.

Different ranges of these pressures can be associated with different brake pipe pressures. For example, a previous measurement of the brake pipe pressure (e.g., the measurement obtained for the determination at 324, 328, and/or 332) or a new measurement of the brake pipe pressure can be obtained. The range of pressures associated with the brake pipe pressure can be selected and compared to the brake cylinder pressure. For example, if the brake pipe pressure is less than five psi, then the selected range of pressures may be 63.5 psi to 79.4 psi. If the brake cylinder pressure is within this range, then the brake cylinder pressure is within allowable limits and flow of the method can proceed toward 406. But, if the brake cylinder pressure is outside of this range, then the brake cylinder pressure is outside of the allowable limits. Flow of the method can proceed toward 408 or 410.

If the brake cylinder pressure is above the range, then flow of the method can proceed toward 408. For example, if the brake cylinder pressure is greater than the upper limit of the selected range of acceptable pressures, then the brake cylinder pressure may be too large. If the brake cylinder pressure is below the range, then flow of the method can proceed toward 410. For example, if the brake cylinder pressure is lower than the lower limit of the selected range of acceptable pressures, then the brake cylinder pressure may be too low. At 408, one or more responsive actions may be implemented. For example, the analysis controller and/or system controller can cause a message (e.g., an error code) to be displayed or otherwise presented to an operator. This message can state that the brake cylinder pressure is higher than expected for an emergency application of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

At 410, one or more responsive actions may be implemented. For example, the analysis controller and/or system controller can cause a message (e.g., an error code) to be displayed or otherwise presented to an operator. This message can state that the brake cylinder pressure is lower than expected for an emergency application of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

Returning to the decision made at 402 (whether the emergency and auxiliary reservoir pressures are equal or substantially equal), if the reservoir pressures are not equal or substantially equal to each other, flow of the method can proceed toward 404. At 404, a determination is made as to whether the emergency reservoir pressure is greater than the auxiliary reservoir pressure. If the emergency reservoir pressure is greater than the auxiliary reservoir pressure, then flow of the method can proceed toward 412 to determine whether the brake cylinder pressure is acceptable. But, if the emergency reservoir pressure and the auxiliary reservoir pressure are not equal (or substantially equal) and the auxiliary pressure is greater than the emergency reservoir pressure, then the method may terminate or return to another operation (e.g., 302 or 308).

At 412, the brake cylinder pressure is measured and compared to a selected range of acceptable pressures. The range of acceptable pressures that is used for this determination can be selected from a second set of several different ranges of pressures stored in at least one of the memories. Different ranges of these pressures can be associated with different brake pipe pressures. For example, a previous measurement of the brake pipe pressure (e.g., the measurement obtained for the determination at 324, 328, and/or 332) or a new measurement of the brake pipe pressure can be obtained. Additionally, the first set of pressure ranges examined at 402 may be different from the second set of pressure ranges examined at 412. For example, the ranges of allowable pressures in the second set may be lower than a majority of the ranges of allowable pressures in the first set. The range of pressures associated with the brake pipe pressure can be selected and compared to the brake cylinder pressure. For example, if the brake pipe pressure is less than five psi, then the selected range of pressures may be 51.3 psi to 66.6 psi. If the brake cylinder pressure is within this range, then the brake cylinder pressure is within allowable limits and flow of the method can proceed toward 406. But, if the brake cylinder pressure is outside of this range, then the brake cylinder pressure is outside of the allowable limits. Flow of the method can proceed toward 414 or 416.

If the brake cylinder pressure is above the range, then flow of the method can proceed toward 416. For example, if the brake cylinder pressure is greater than the upper limit of the selected range of acceptable pressures, then the brake cylinder pressure may be too large. If the brake cylinder pressure is below the range, then flow of the method can proceed toward 414. For example, if the brake cylinder pressure is lower than the lower limit of the selected range of acceptable pressures, then the brake cylinder pressure may be too low.

At 416, one or more responsive actions may be implemented. For example, the analysis controller and/or system controller can cause a message (e.g., an error code) to be displayed or otherwise presented to an operator. This message can state that the brake cylinder pressure is higher than expected for a full service application of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

At 414, one or more responsive actions may be implemented. For example, the analysis controller and/or system controller can cause a message (e.g., an error code) to be displayed or otherwise presented to an operator. This message can state that the brake cylinder pressure is lower than expected for a full service of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as 302 or 308.

Returning to the decisions made at 402 and/or 412, if the brake cylinder pressure is within the range of acceptable pressures, flow of the method can proceed to one or more leakage tests, as described above. For example, at 406, leakage from the emergency reservoir can be measured (similar to as described above in connection with 350 in FIG. 3B) and compared to a leakage threshold and/or a rate threshold. If the measured leakage from the emergency reservoir is more than the corresponding threshold associated with the emergency reservoir, then the measured leakage may be unacceptable, and flow of the method can proceed toward 418. At 418, the emergency reservoir leakage test can be performed, similar to as described above at 356 in FIG. 3B. One example of this emergency reservoir leakage test is described below in connection with FIG. 4. If the measured leakage from the emergency reservoir is acceptable, however, then flow of the method can proceed from 406 toward 420.

At 420, leakage from the auxiliary reservoir can be measured, as described above in connection with 358 in FIG. 3B. If the amount and/or rate of leakage from the auxiliary reservoir is greater than the corresponding threshold, then flow of the method can proceed toward 422. At 422, an auxiliary reservoir leakage test can be performed, as described above in connection with 360 in FIG. 3B. One example of this auxiliary reservoir leakage test is described below in connection with FIG. 5. If the amount and/or rate of leakage is not greater than the corresponding threshold, then flow of the method can proceed toward 424.

At 424, leakage from the brake cylinder can be measured, as described above in connection with 362 in FIG. 3B. If the amount and/or rate of leakage is greater than the corresponding threshold, then flow of the method can proceed toward 426. At 426, a brake cylinder leakage test can be performed, as described above in connection with 364 in FIG. 3B. One example of this brake cylinder leakage test is described below in connection with FIG. 6. If the amount and/or rate of leakage is not greater than the corresponding threshold, then flow of the method can proceed toward 428.

If the measured leakages are within the acceptable limits (e.g., below the associated thresholds), flow of the method may terminate following 428 or may return to one or more other operations, such as 302 or 308.

Figures 4, 5:
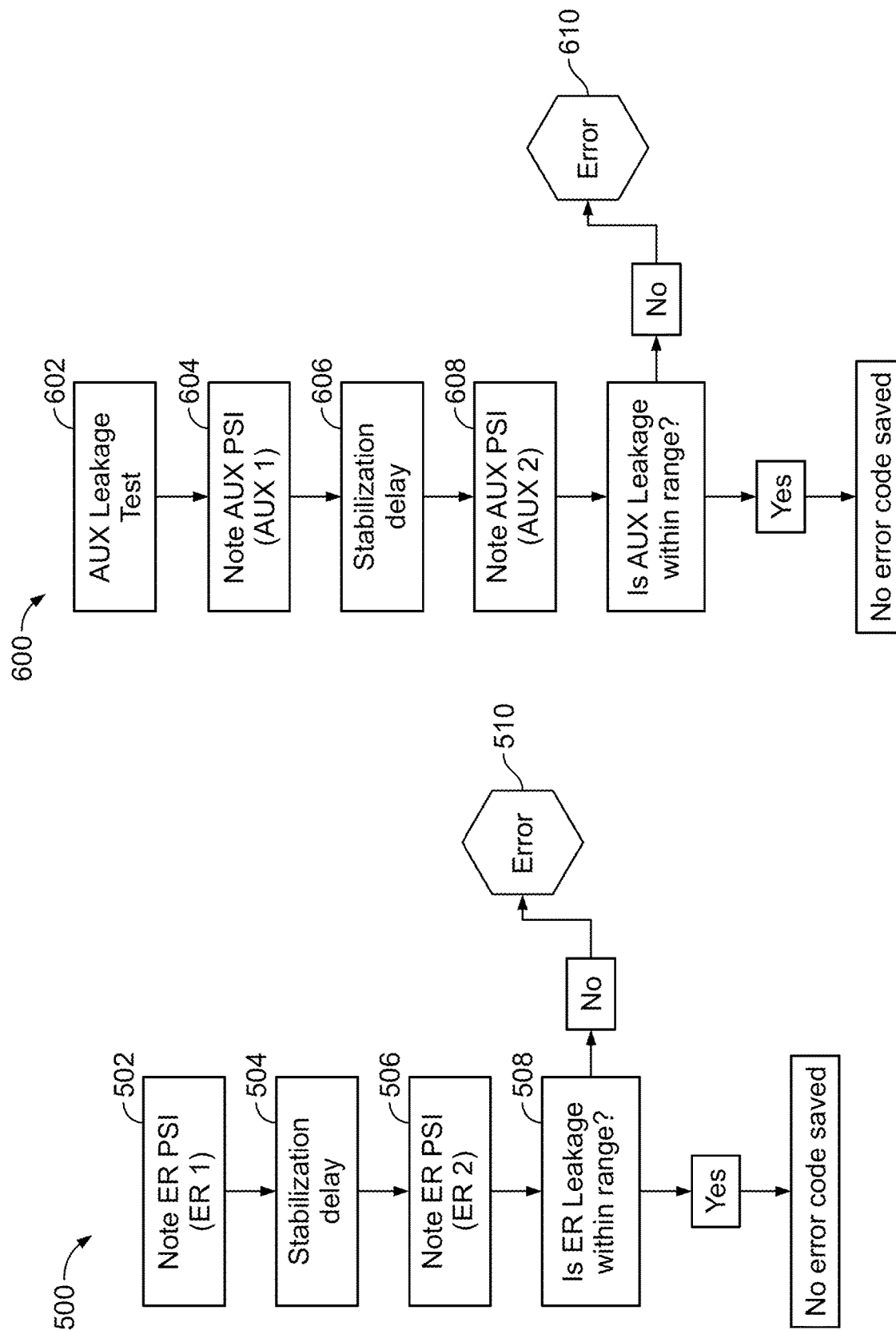
FIG. 4 illustrates one example of a flowchart of a method for an emergency reservoir leakage test.
FIG. 5 illustrates one example of a flowchart of a method for an auxiliary reservoir leakage test.

FIG. 4 illustrates a flowchart of one example of an emergency reservoir leakage test method 500. As described above, the emergency reservoir leakage test can be performed at one or more of 320, 350, 356, 380, 386, 406, 418. At 502, a first measurement of the pressure in the emergency reservoir is obtained. At 504, a measurement delay is performed. The measurement delay can include no new pressure measurements being obtained for at least a designated, non-zero period of time to permit the pressure to decrease by a measurable amount in the event that there is a leak. This period of time can be five seconds, thirty seconds, sixty seconds, or the like. At 506, a second measurement of the pressure in the emergency reservoir is obtained. At 508, leakage from the emergency reservoir is determined based on a difference between the first and second pressure measurements. For example, the leakage can be calculated as the difference between the first and second measurements. This leakage can be compared to a threshold pressure to determine whether there is a leak. For example, if the second pressure is at least three psi less than the first pressure and the threshold is less than three psi, then a leak may be identified at 508. As a result, flow of the method can proceed toward 510. If the leakage is not greater than the threshold, then no leak may be identified at 508. As a result, flow of the method can proceed toward 322 in FIG. 3A, toward 358 or 366 in FIG. 3B, toward 388 or 396 in FIG. 3C, or toward 420 or 428 in FIG. 3D.

At 510, one or more responsive actions may be implemented in response to identifying the leak. For example, the analysis controller and/or system controller can cause a message (e.g., an error code) to be displayed or otherwise presented to an operator. This message can state that there is excessive leakage from the emergency reservoir. As another example, the analysis controller and/or system controller can send a message to an off-board location to request, schedule, and/or initiate an inspection and/or repair of the brake system when the vehicle system arrives at an upcoming location. Flow of the method can then return to one or more other operations, such as toward 322 in FIG. 3A, toward 358 or 366 in FIG. 3B, toward 388 or 396 in FIG. 3C, or toward 420 or 428 in FIG. 3D.

FIG. 5 illustrates a flowchart of one example of an auxiliary reservoir leakage test method 600. As described above, the auxiliary reservoir leakage test can be performed at one or more of 358, 360, 388, 390, 420, 422. At 602, a first measurement of the pressure in the auxiliary reservoir is obtained. At 604, a measurement delay is performed. The measurement delay can include no new pressure measurements being obtained for at least a designated, non-zero period of time to permit the pressure to decrease by a measurable amount in the event that there is a leak. This period of time can be five seconds, thirty seconds, sixty seconds, or the like. At 606, a second measurement of the pressure in the auxiliary reservoir is obtained. At 608, leakage from the auxiliary reservoir is determined based on a difference between the first and second pressure measurements. For example, the leakage can be calculated as the difference between the first and second measurements. This leakage can be compared to a threshold pressure to determine whether there is a leak. For example, if the second pressure is at least five psi less than the first pressure and the threshold is less than five psi, then a leak may be identified at 608. As a result, flow of the method can proceed toward 610. If the leakage is not greater than the threshold, then no leak may be identified at 608. As a result, flow of the method can proceed toward 362 or 366 in FIG. 3B, toward 392 or 396 in FIG. 3C, or toward 424 or 428 in FIG. 3D.

At 610, one or more responsive actions may be implemented in response to identifying the leak. For example, the analysis controller and/or system controller can cause a message (e.g., an error code) to be displayed or otherwise presented to an operator. This message can state that there is excessive leakage from the auxiliary reservoir. As another example, the analysis controller and/or system controller can send a message to an off-board location to request, schedule, and/or initiate an inspection and/or repair of the brake system when the vehicle system arrives at an upcoming location. Flow of the method can then return to one or more other operations, such as toward 362 or 366 in FIG. 3B, toward 392 or 396 in FIG. 3C, or toward 424 or 428 in FIG. 3D.

Figure 6:
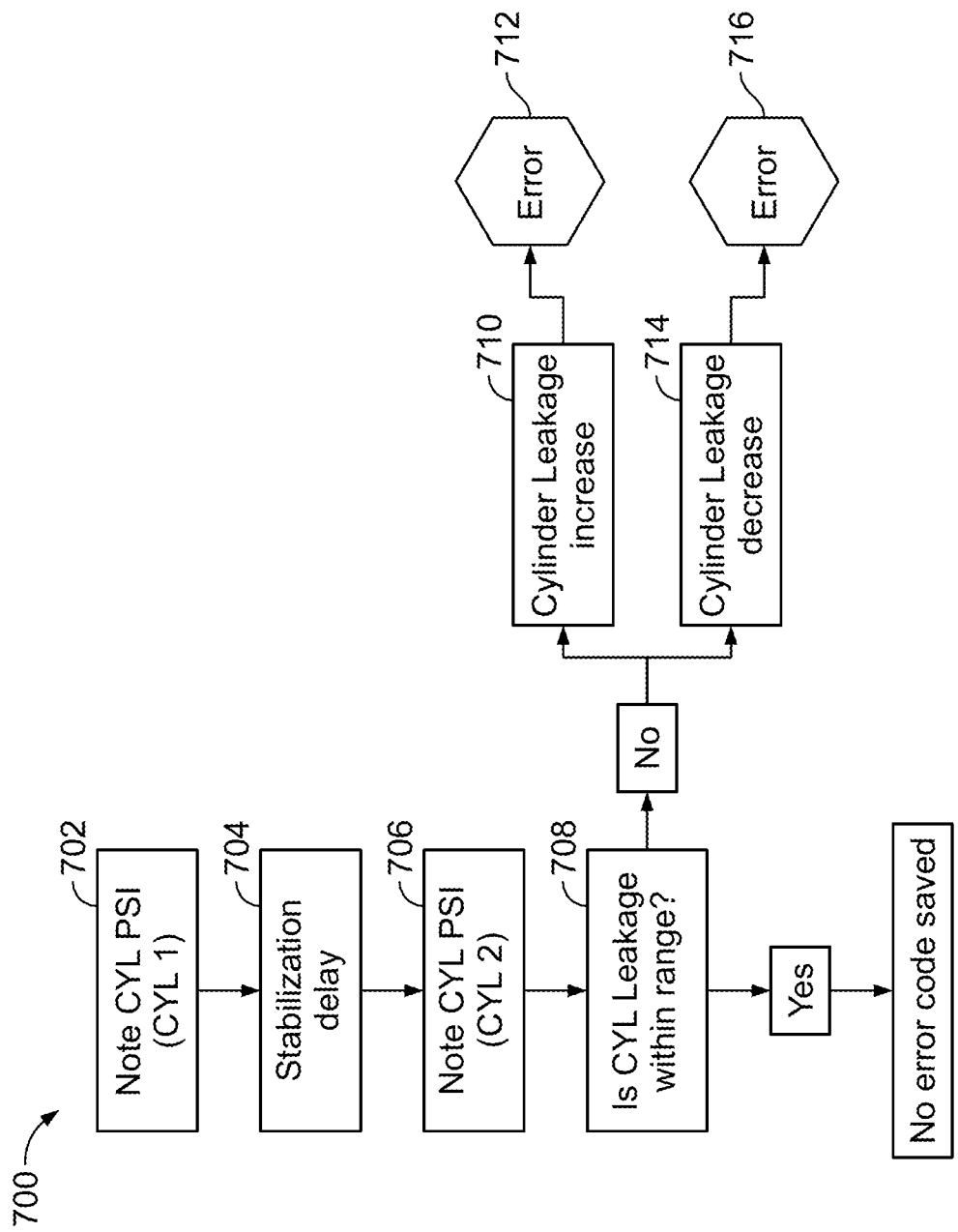
FIG. 6 illustrates one example of a flowchart of a method for a brake cylinder leakage test.

FIG. 6 illustrates a flowchart of one example of a brake cylinder leakage test method 700. As described above, the brake cylinder leakage test can be performed at one or more of 362, 364, 392, 394, 424, 426. At 702, a first measurement of the pressure in the brake cylinder is obtained. At 704, a measurement delay is performed. The measurement delay can include no new pressure measurements being obtained for at least a designated, non-zero period of time to permit the pressure to decrease by a measurable amount in the event that there is a leak. This period of time can be five seconds, thirty seconds, sixty seconds, or the like. At 706, a second measurement of the pressure in the brake cylinder is obtained. At 708, leakage from the brake reservoir is determined based on a difference between the first and second pressure measurements.

The leakage can be calculated as the difference between the first and second measurements and the direction of leakage can be determined based on whether the second measurement is a larger or smaller pressure than the first measurement. For example, the first pressure measurement can be subtracted from the second pressure measurement to calculate a pressure difference. If this pressure difference is a positive number that is larger than a threshold (e.g., three psi), then a leak of air into the brake cylinder may be identified at 710. As a result, one or more responsive actions may be implemented at 712 in response to identifying the leak into the brake cylinder. For example, the analysis controller and/or system controller can cause a message (e.g., an error code) to be displayed or otherwise presented to an operator. This message can state that there is leakage of air into the brake cylinder. As another example, the analysis controller and/or system controller can send a message to an off-board location to request, schedule, and/or initiate an inspection and/or repair of the brake system when the vehicle system arrives at an upcoming location.

As another example, if the pressure difference is a negative number that is larger than a threshold (e.g., the absolute value of the negative pressure difference is larger than the threshold), then a leak of air out of the brake cylinder may be identified at 714. As a result, one or more responsive actions may be implemented at 716 in response to identifying the leak out of the brake cylinder. For example, the analysis controller and/or system controller can cause a message (e.g., an error code) to be displayed or otherwise presented to an operator. This message can state that there is leakage of air out of the brake cylinder. As another example, the analysis controller and/or system controller can send a message to an off-board location to request, schedule, and/or initiate an inspection and/or repair of the brake system when the vehicle system arrives at an upcoming location.

But, if the difference between the pressure measurements (or the absolute value of this difference) does not exceed the threshold at 708, then no leak may be identified. Flow of the method 700 can proceed from 708, 712, or 716 to one or more of 366 in FIG. 3B, 396 in FIG. 3C, or 428 in FIG. 3D, or may terminate.

While one or more embodiments of the inventive subject matter described herein relate to rail vehicles and air brake systems, not all embodiments are limited to rail vehicles and/or air brake systems. One or more embodiments may be used in connection with other vehicle types, such as trucks pulling trailers with air brakes; automobiles or other vehicles having hydraulic brakes (where the hydraulic fluid pressure is measured instead of air pressure to locate the leak inside the vehicle); or the like. Stated differently, the subject matter described herein may be used to monitor pressures in a brake system to identify or quantify the health of various components of the brake system in a variety of vehicles or vehicle systems, and may not be limited to only monitoring brake pressures in rail vehicles.

In one embodiment, a method is provided that includes measuring pressures in different components of a brake system of a vehicle system during movement of the vehicle system, comparing two or more of the pressures that are measured in the different components with each other to select a health monitoring mode, selecting one or more allowable pressures based on the health monitoring mode that is selected, and determining a state of health of the brake system by comparing one or more of the pressures that is measured with the one or more allowable pressures that are selected.

Optionally, the pressures are measured in two or more of a brake cylinder, an auxiliary reservoir, an emergency reservoir, or a brake pipe of the vehicle system.

Optionally, the vehicle system includes one or more of a rail vehicle, an automobile, or a truck.

Optionally, the brake system is an air brake system.

Optionally, the brake system is a hydraulic brake system.

Optionally, the pressures are measured in each of a brake cylinder, an auxiliary reservoir, an emergency reservoir, and a brake pipe of the vehicle system.

Optionally, the health monitoring mode is selected from among several different health monitoring modes based on a difference between the pressures measured in at least two of the different components.

Optionally, the pressures are measured in an emergency reservoir, in a brake pipe, and in a brake cylinder of the vehicle system, and the state of health is determined based on the pressure measured in the brake cylinder and based on a difference between the pressure measured in the emergency reservoir and the pressure measured in the brake pipe.

Optionally, the state of health that is determined based on the pressure measured in the brake cylinder and based on the difference between the pressure measured in the emergency reservoir and the pressure measured in the brake pipe is one or more of a brake that is in a stuck position or a retainer valve that is stuck in a high pressure state.

Optionally, the state of health that is determined based on the pressure measured in the brake cylinder and based on the difference between the pressure measured in the emergency reservoir and the pressure measured in the brake pipe is a brake that is unintentionally released.

Optionally, the state of health that is determined by selecting a range of allowable pressures from among several different ranges of allowable pressures associated with different values of the difference between the pressure measured in the emergency reservoir and the pressure measured in the brake pipe and by determining whether the pressure measured in the brake cylinder is within the range of allowable pressures.

Optionally, the pressures are measured in an emergency reservoir, in a brake pipe, and in an auxiliary reservoir of the vehicle system.

Optionally, the state of health that is determined by selecting a set of different ranges of allowable pressures from among several different sets of different ranges of allowable pressures based on a comparison between the pressure measured in the emergency reservoir and the pressure measured in the auxiliary reservoir and selecting a range of allowable pressures from among the different ranges of allowable pressures in the set that is selected. The different ranges can be associated with different values of the pressure measured in the brake pipe. The state of health also can be determined by determining whether the pressure measured in the brake cylinder is within the range of allowable pressures that is selected.

In one embodiment, a system is provided that includes pressure sensors configured to measure pressures in different components of a brake system of a vehicle system during activation of the brake system and a controller configured to compare two or more of the pressures that are measured in the different components with each other to select a health monitoring mode. The controller is configured to select one or more allowable pressures based on the health monitoring mode that is selected and to determine a state of health of the brake system by comparing one or more of the pressures that is measured with the one or more allowable pressures that are selected.

Optionally, the pressure sensors include two or more of a brake cylinder pressure sensor, an auxiliary reservoir pressure sensor, an emergency reservoir pressure sensor, or a brake pipe pressure sensor.

Optionally, the pressure sensors include a brake cylinder pressure sensor, an auxiliary reservoir pressure sensor, an emergency reservoir pressure sensor, and a brake pipe pressure sensor.

Optionally, the controller is configured to select the health monitoring mode from among several different health monitoring modes based on a difference between the pressures measured in at least two of the different components.

Optionally, the pressure sensors include an emergency reservoir pressure sensor, a brake pipe pressure sensor, and a brake cylinder pressure sensor, and the controller is configured to determine the state of health based on the pressure measured by the brake cylinder pressure sensor and based on a difference between the pressure measured by the emergency reservoir pressure sensor and the pressure measured by the brake pipe pressure sensor.

Optionally, the controller is configured to determine the state of health as one or more of a brake that is in a stuck position or a retainer valve that is stuck in a high pressure state based on the pressure measured by the brake cylinder pressure sensor and based on the difference between the pressure measured by the emergency reservoir pressure sensor and the pressure measured by the brake pipe pressure sensor.

Optionally, the controller is configured to determine the state of health as a brake that is unintentionally released based on the pressure measured by the brake cylinder pressure sensor and based on the difference between the pressure measured by the emergency reservoir pressure sensor and the pressure measured by the brake pipe pressure sensor.

Optionally, the controller is configured to determine the state of health by selecting a range of allowable pressures from among several different ranges of allowable pressures associated with different values of the difference between the pressure measured in the emergency reservoir and the pressure measured in the brake pipe, and by determining whether the pressure measured in the brake cylinder is within the range of allowable pressures.

Optionally, the pressure sensors include an emergency reservoir pressure sensor, a brake pipe pressure sensor, and an auxiliary reservoir pressure sensor.

Optionally, the controller is configured to determine the state of health by selecting a set of different ranges of allowable pressures from among several different sets of different ranges of allowable pressures, the set selected by the controller based on a comparison between the pressure measured in the emergency reservoir and the pressure measured in the auxiliary reservoir, selecting a range of allowable pressures from among the different ranges of allowable pressures in the set that is selected, the different ranges associated with different values of the pressure measured in the brake pipe, and determining whether the pressure measured in the brake cylinder is within the range of allowable pressures that is selected.

Optionally, the pressure sensors are configured to measure two or more of the pressures are measured in the same component at different times, and the controller is configured to determine the state of health as a leak based on the two or more pressures that are measured.

In one embodiment, a method is provided that includes measuring pressures in different components of a brake system of a vehicle system, comparing two or more of the pressures that are measured in the different components with each other to select a health monitoring mode, and determining a state of health of the brake system by comparing one or more of the pressures that is measured with the one or more allowable pressures that are selected.

Optionally, the pressures are measured in two or more of a brake cylinder, an auxiliary reservoir, an emergency reservoir, or a brake pipe of the vehicle system.

Optionally, the health monitoring mode is selected from among several different health monitoring modes based on a difference between the pressures measured in at least two of the different components.

In any of the systems or methods described herein, the determined state of health can be used as a basis for one or more of controlling movement of the vehicle system, controlling an onboard device of the vehicle system, scheduling a maintenance operation of the vehicle, scheduling movement of the vehicle system, controlling a display to display the state of health, etc.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
measuring pressures, with pressure sensors, in different components of a brake system of a vehicle system during movement of the vehicle system;
comparing two or more of the pressures that are measured in the different components with each other to select one of at least two health monitoring modes, wherein each of the at least two health monitoring modes corresponds to a different potential issue with the brake system;
selecting one or more allowable pressures based on the health monitoring mode that is selected;
determining a state of health of the brake system by comparing one or more of the pressures that is measured with the one or more allowable pressures that are selected; and
controlling movement of the vehicle system based on the state of health of the brake system that is determined.

2. The method of claim 1, wherein the controlling movement of the vehicle system includes steering the vehicle system toward a location.

3. The method of claim 1, wherein the pressures are measured in two or more of a brake cylinder, an auxiliary reservoir, an emergency reservoir, or a brake pipe of the vehicle system.

4. The method of claim 1, wherein the health monitoring mode is selected from among several different health monitoring modes based on a difference between the pressures measured in at least two of the different components.

5. The method of claim 1, wherein the pressures include a first pressure measured in an emergency reservoir, a second pressure measured in a brake pipe, and a third pressure measured in a brake cylinder of the vehicle system, and the state of health is determined based on the third pressure measured in the brake cylinder and based on a difference between the first pressure measured in the emergency reservoir and the second pressure measured in the brake pipe.

6. The method of claim 5, wherein the state of health that is determined based on the third pressure measured in the brake cylinder and based on the difference between the first pressure measured in the emergency reservoir and the second pressure measured in the brake pipe is one or more of a brake that is in a stuck position or a retainer valve that is stuck in a high pressure state.

7. The method of claim 5, wherein the state of health that is determined based on the third pressure measured in the brake cylinder and based on the difference between the first pressure measured in the emergency reservoir and the second pressure measured in the brake pipe is a brake that is unintentionally released.

8. The method of claim 5, wherein the state of health that is determined by:
selecting a range of allowable pressures from among several different ranges of allowable pressures associated with different values of the difference between the first pressure measured in the emergency reservoir and the second pressure measured in the brake pipe; and
determining whether the third pressure measured in the brake cylinder is within the range of allowable pressures.

9. The method of claim 1, wherein the pressures include a first pressure measured in an emergency reservoir, a second pressure measured in a brake pipe, and a third pressure measured in an auxiliary reservoir of the vehicle system, and the state of health is determined by:
selecting a set of different ranges of allowable pressures from among several different sets of different ranges of allowable pressures based on a comparison between the first pressure measured in the emergency reservoir and the third pressure measured in the auxiliary reservoir;
selecting a range of allowable pressures from among the different ranges of allowable pressures in the set that is selected, the different ranges associated with different values of the second pressure measured in the brake pipe; and
determining whether a fourth pressure of the pressures that is measured in a brake cylinder is within the range of allowable pressures that is selected.

10. The method of claim 1, wherein two or more of the pressures are measured in the same component at different times, and the state of health that is determined is a leak that is identified based on the two or more of the pressures that are measured.

11. A system comprising:
pressure sensors configured to measure pressures in different components of a brake system of a vehicle system during activation of the brake system; and
a controller configured to compare two or more of the pressures that are measured in the different components with each other to select one of at least two health monitoring modes, wherein each of the at least two health monitoring modes corresponds to a different potential issue with the brake system, the controller also configured to select one or more allowable pressures based on the health monitoring mode that is selected and to determine a state of health of the brake system by comparing one or more of the pressures that is measured with the one or more allowable pressures that are selected, the controller also configured to control slowing or stopping of the vehicle system based on the state of health of the brake system.

12. The system of claim 11, wherein the controller is configured to select the health monitoring mode from among several different health monitoring modes based on a difference between the pressures measured in at least two of the different components.

13. The system of claim 11, wherein the pressure sensors include an emergency reservoir pressure sensor, a brake pipe pressure sensor, and a brake cylinder pressure sensor, and the controller is configured to determine the state of health based on the pressure measured by the brake cylinder pressure sensor and based on a difference between the pressure measured by the emergency reservoir pressure sensor and the pressure measured by the brake pipe pressure sensor.

14. The system of claim 13, wherein the controller is configured to determine the state of health as one or more of a brake that is in a stuck position or a retainer valve that is stuck in a high pressure state based on the pressure measured by the brake cylinder pressure sensor and based on the difference between the pressure measured by the emergency reservoir pressure sensor and the pressure measured by the brake pipe pressure sensor.

15. The system of claim 13, wherein the controller is configured to determine the state of health as a brake that is unintentionally released based on the pressure measured by the brake cylinder pressure sensor and based on the difference between the pressure measured by the emergency reservoir pressure sensor and the pressure measured by the brake pipe pressure sensor.

16. The system of claim 13, wherein the controller is configured to determine the state of health by selecting a range of allowable pressures from among several different ranges of allowable pressures associated with different values of the difference between the pressure measured in an emergency reservoir and the pressure measured in a brake pipe, and by determining whether the pressure measured in a brake cylinder is within the range of allowable pressures.

17. The system of claim 13, wherein the pressure sensors include an emergency reservoir pressure sensor, a brake pipe pressure sensor, and an auxiliary reservoir pressure sensor, and the controller is configured to determine the state of health by selecting a set of different ranges of allowable pressures from among several different sets of different ranges of allowable pressures, the set selected by the controller based on a comparison between the pressure measured in an emergency reservoir and the pressure measured in an auxiliary reservoir, selecting a range of allowable pressures from among the different ranges of allowable pressures in the set that is selected, the different ranges associated with different values of the pressure measured in a brake pipe, and determining whether the pressure measured in a brake cylinder is within the range of allowable pressures that is selected.

18. A method comprising:
measuring pressures, with pressure sensors, in different components of a brake system of a vehicle system;
comparing two or more of the pressures that are measured in the different components with each other to select one of at least two health monitoring modes from among the at least two health monitoring modes that are each associated with a different set of one or more allowable pressures, wherein each of the at least two health monitoring modes corresponds to a different potential issue with the brake system;
determining a state of health of the brake system by comparing one or more of the pressures that is measured with the one or more allowable pressures that are associated with the health monitoring mode that is selected; and
slowing or stopping movement of the vehicle system based on the state of health of the brake system that is determined.

19. The method of claim 18, wherein the pressures are measured in two or more of a brake cylinder, an auxiliary reservoir, an emergency reservoir, or a brake pipe of the vehicle system.

20. The method of claim 18, wherein the health monitoring mode is selected from among several different health monitoring modes based on a difference between the pressures measured in at least two of the different components.

* * * * *